(12) United States Patent
Li

(10) Patent No.: US 10,816,866 B2
(45) Date of Patent: Oct. 27, 2020

(54) REFLECTIVE ELECTROCHROMIC DISPLAY PANEL

(71) Applicant: SHENZHEN CHINA STAR OPTOELECTRONICS SEMICONDUCTOR DISPLAY TECHNOLOGY CO., LTD., Shenzhen, Guangdong (CN)

(72) Inventor: Xiang Li, Guangdong (CN)

(73) Assignee: SHENZHEN CHINA STAR OPTOELECTRONICS SEMICONDUCTOR DISPLAY TECHNOLOGY CO., LTD., Shenzhen (CN)

( * ) Notice: Subject to any disclaimer, the term of this patent is extended or adjusted under 35 U.S.C. 154(b) by 363 days.

(21) Appl. No.: 15/735,919

(22) PCT Filed: Nov. 23, 2017

(86) PCT No.: PCT/CN2017/112467
§ 371 (c)(1),
(2) Date: Dec. 12, 2017

(87) PCT Pub. No.: WO2019/071733
PCT Pub. Date: Apr. 18, 2019

(65) Prior Publication Data
US 2019/0384133 A1 Dec. 19, 2019

(30) Foreign Application Priority Data
Oct. 9, 2017 (CN) .......................... 2017 1 0928073

(51) Int. Cl.
*G02F 1/155* (2006.01)
*G02F 1/1516* (2019.01)
(Continued)

(52) U.S. Cl.
CPC .............. *G02F 1/155* (2013.01); *G02F 1/157* (2013.01); *G02F 1/15165* (2019.01); *G02F 1/163* (2013.01); *G02F 2001/1635* (2013.01)

(58) Field of Classification Search
CPC . G02F 1/15; G02F 1/153; G02F 1/155; G02F 1/163
See application file for complete search history.

(56) References Cited

U.S. PATENT DOCUMENTS 6,597,488 B2 * 7/2003 Johnson ................ G02F 1/1523
359/245
9,235,098 B2 * 1/2016 Noh ......................... G02F 1/153
(Continued)

FOREIGN PATENT DOCUMENTS

CN 105278199 A 1/2016

*Primary Examiner* — Zachary W Wilkes
(74) *Attorney, Agent, or Firm* — Hemisphere Law, PLLC; Zhigang Ma

(57) ABSTRACT

The disclosure discloses a reflective electrochromic display panel, and the reflective electrochromic display panel includes: an upper substrate, a common electrode layer, an electrochromic layer, a pixel electrode layer and a lower substrate sequentially arranged from top to bottom. The electrochromic layer includes a red electrochromic layer, a green electrochromic layer and a blue electrochromic layer. The electrochromic layers reflecting corresponding lights upon receiving a voltage, and the reflection light of the electrochromic layers is zero when no voltage is received. The display panel of the disclosure is equipped with an electrochromic layer, and the different voltage characteristics of the electrochromic layer are used to improve the utilization of light and visual angle limitation of the display panel, thereby improving the performance of the liquid crystal display.

12 Claims, 2 Drawing Sheets

(51) Int. Cl.
  *G02F 1/157* (2006.01)
  *G02F 1/163* (2006.01)

(56) References Cited

U.S. PATENT DOCUMENTS

| | | | |
|---|---|---|---|
| 9,360,730 B2 * | 6/2016 | Shi | G02F 1/157 |
| 2009/0153939 A1 * | 6/2009 | Roh | G02F 1/167 |
| | | | 359/270 |
| 2014/0049805 A1 | 2/2014 | Gu | |
| 2015/0338714 A1 | 11/2015 | Li | |
| 2017/0117505 A1 | 4/2017 | Kwon | |

* cited by examiner

REFLECTIVE ELECTROCHROMIC DISPLAY PANEL

RELATED APPLICATIONS

The present application is a National Phase of International Application Number PCT/CN2017/112467, filed Nov. 23, 2017, and claims the priority of China Application No. 201710928073.0, filed Oct. 9, 2017.

FIELD OF THE DISCLOSURE

The disclosure relates to a display technical field, and more particularly to a reflective electrochromic display panel.

BACKGROUND

With the development of display technology, there has been a display panel using electrochromic materials. Compared with the TFT-LCD, the electrochromic display panel does not need to use the polarizer and the color resistance, it may greatly improve the utilization of the light of the display, and has the advantages of not dependent on visual angle, memory function, etc.

The manufacturing method of a conventional electrochromic device mainly deposits or polymerizes electrochromic films on the conductive glass. The color display thereof is usually realized by electrochromic materials of three colors. The electrochromic materials include a red electrochromic material, a green electrochromic material and a blue electrochromic material. The three electrochromic materials respectively take place oxidation-reduction reaction when energized to represent red, green and blue. The different voltages may control the brightness of light output of different colors to achieve the color display. When not energized, the three color electrochromic materials are all transparent. However, in a conventional transmissive display, the black display may not be achieved by the electrochromic display, and it requires a backlight source.

According to the type of the light source used and the setting of the light source, the liquid crystal display may be divided into a transmissive liquid crystal display, a transflective liquid crystal display and a reflective liquid crystal display. Since the reflective liquid crystal display may utilize an ambient light to display, backlights of high energy consumption may not be needed, and therefore it has great potential for applications in mobile devices and wearable display devices.

However, the reflective liquid crystal display has two problems. 1. Since the ambient light goes back and forth through the respective layer (especially the color resist) twice, such that the loss of the ambient light is higher, the utilization of brightness is low, thereby easily leading to a darker brightness of the picture displayed by a liquid crystal display panel. 2. In order to enable reflection images to be viewed by observers from multiple viewpoints, the metal reflective electrode must be designed as a reflection manner of diffuse reflection. In this way, the problems such as uneven brightness and limited visual angle may easily occur.

SUMMARY

A technical problem to be solved by the disclosure is to provide a reflective electrochromic display panel, the internal structure of the display panel is changed and the electrochromic material is used to reflection incident light by, so as to improve the characteristics of the liquid crystal display.

In order to solve the technical problem, the disclosure provides a reflective electrochromic display panel, and the display panel includes:

an upper substrate, a common electrode layer, an electrochromic layer, a pixel electrode layer and a lower substrate sequentially arranged from top to bottom; the electrochromic layer comprising a red electrochromic layer, a green electrochromic layer and a blue electrochromic layer, the red electrochromic layer reflecting a red light when receiving a voltage, the green electrochromic layer reflecting a green light when receiving the voltage, the blue electrochromic layer reflecting a blue light when receiving the voltage, and the intensity of the reflected light being increased with the increasing voltage;

the reflected light of the red electrochromic layer, the green electrochromic layer, and the blue electrochromic layer being zero when not receiving the voltage;

a partition arranged among the red electrochromic layer, the green electrochromic layer and the blue electrochromic layer; and the pixel electrode layer including a thin film transistor, a source, a drain, and a corresponding insulating layer.

In order to solve the above technical problem, the disclosure further provides a reflective electrochromic display panel, and the display panel includes:

an upper substrate, a common electrode layer, an electrochromic layer, a pixel electrode layer and a lower substrate sequentially arranged from top to bottom; the electrochromic layer comprising a red electrochromic layer, a green electrochromic layer and a blue electrochromic layer, the red electrochromic layer reflecting red light when receiving a voltage, the green electrochromic layer reflecting green light when receiving the voltage, the blue electrochromic layer reflecting blue light when receiving the voltage, and the intensity of the reflected light being increased with the increasing voltage; the reflected light of the red electrochromic layer, the green electrochromic layer, and the blue electrochromic layer being zero when not receiving the voltage.

The advantageous effect of the disclosure is that different from the prior art, the display panel of the disclosure is equipped with an electrochromic layer, and the different voltage characteristics of the electrochromic layer is used to improve the utilization of light and visual angle limitation of the display panel, thereby improving the performance of the liquid crystal display. In addition, compared with the general display technology, the basic structural of the reflective liquid crystal display device adopted by the disclosure effectively reduces the energy consumption of the device, and overcomes the defects that the general electrochromic display device may not display the black color through the principle of the reflective liquid crystal display device.

DETAILED DESCRIPTION OF PREFERRED EMBODIMENTS

Figure 1:
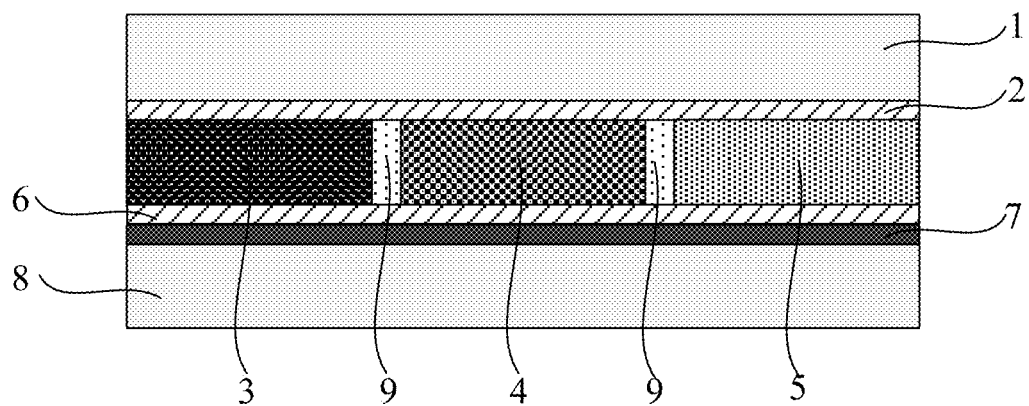
FIG. 1 is a structural schematic view of a reflective electrochromic display panel according to an embodiment of the disclosure.

Refer to FIG. 1, FIG. 1 is a structural schematic view a reflective electrochromic display panel according to an embodiment of the disclosure. The reflective electrochromic display panel includes an upper substrate 1, a common electrode layer 2, an electrochromic layer, a pixel electrode layer 6 and a lower substrate 8 sequentially arranged from top to bottom. In this embodiment, the upper substrate 1 is a glass substrate. In other embodiments, the upper substrate 1 may also be one of a transparent film package or a transparent flexible substrate. The electrochromic layer includes a red electrochromic layer 3, a green electrochromic layer 4 and a blue electrochromic layer 5. The lower substrate 8 is a transparent substrate, and a black light shield layer 7 is arranged on the lower substrate 8. In this embodiment, a material of the light shield layer is a Cr metal, an acrylic resin incorporated with a black pigment, or a black resin formed by incorporating raw materials, such as carbon, Ti and Ni with a photoresist. The black light shield layer 7 may absorb the external light so that the external light does not affect the screen display. The electrochromic layer is arranged between the common electrode layer 2 and the pixel electrode layer 6. In this embodiment, the pixel electrode layer 6 includes a thin film transistor, a source, a drain, and a corresponding insulating layer. The structure of the pixel electrode layer 6 is the same as the structure of the existing liquid crystal panel, and the description thereof does not be described in detail here. A partition 9 is arranged among the red electrochromic layer 3, the green electrochromic layer 4, and the blue electrochromic layer 5, so as to avoid color mixing occurred among the red electrochromic layer 3, the green electrochromic layer 4, and the blue electrochromic layer 5. In this embodiment, the common electrode layer 2 and the pixel electrode layer 6 are transparent electrode layers, so as to facilitate a light transmission. Preferably, a material of the common electrode layer 2 and the pixel electrode layer 6 is ITO (Indium Tin Oxide) material. In order to ensure the display effect of the display panel, the common electrode layer 2, the pixel electrode layer 6 and the electrochromic layers (3, 4, 5) are arranged at intervals to ensure the insulation among the common electrode layer 2, the pixel electrode layer 6 and the electrochromic layers (3, 4, 5) arranged at intervals. Materials of the electrochromic layers (3, 4, 5) include one or more of viologen, polythiophene and derivative thereof, polyaniline compound, pyridine compound, anthraquinone compound, rare earth element organic compound.

Figure 2:
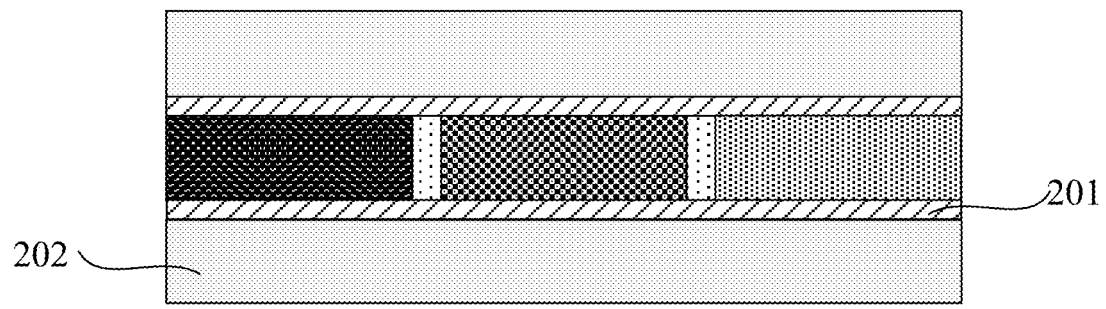
FIG. 2 is a structural schematic view of a reflective electrochromic display panel according to another embodiment of the disclosure.

In another specific embodiment, as shown in FIG. 2, the lower substrate 202 is a black opaque substrate, and the lower substrate 202 may absorb external light so that the external light does not affect the screen display.

Hereinafter, an operation method of the display panel of the disclosure is described in detail.

An external voltage is applied to the pixel electrode layer 6 and the common electrode layer 2, and a control voltage is driven by the passive matrix electrode. Specifically, the pixel electrode layer 6 and the common electrode layer 2 choose the electrochromic layers (3, 4, 5) through the address line, so as to control the voltage of each of electrochromic layers (3, 4, 5). In addition, the pixel electrode layer 6 and the common electrode layer 2 are electrically connected by a TFT (Thin Film Transistor) switch, and the external applied is controlled by the TFT switch.

Figure 3:
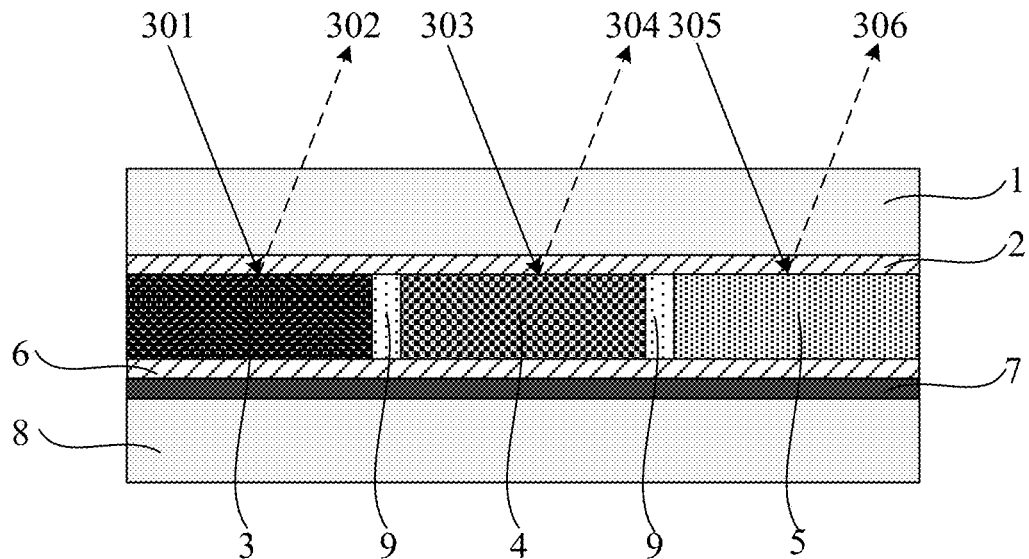
FIG. 3 is a display principle diagram of a reflective electrochromic display panel in a first working state according to an embodiment of the disclosure.

When the red electrochromic layer 3, the green electrochromic layer 4 and the blue electrochromic layer 5 do not receive a voltage, as shown in FIG. 3, the red electrochromic layer 3, the green electrochromic layer 4 and the blue electrochromic layer 5 display as a transparent state and do not reflect the external light. At this time, the display panel displays black color.

Figure 4:
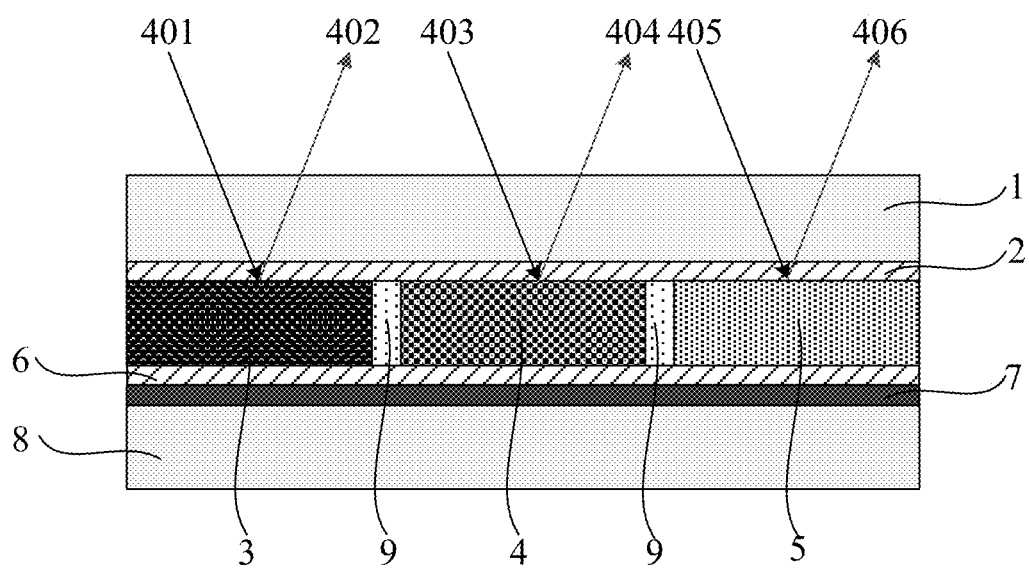
FIG. 4 is a display principle diagram of a reflective electrochromic display panel in a second working state according to an embodiment of the disclosure.

When the external voltage is applied, as shown in FIG. 4, after the incident light passes through the transparent metal electrode (the common electrode layer 2), the incident light enters the electrochromic layers (3, 4, 5) and reflects the incident light directly in the electrochromic layers (3, 4, 5). The green electrochromic layer 3 reflects the incident light 401 and reflects a green light 402. The red electrochromic layer 4 reflects the incident light 403 and reflects the red light 404. The blue electrochromic layer 5 reflects the incident light 405, and reflects a blue light 406. Moreover, the intensity of the reflected light is increased with the increasing voltage. The display panel further superimposes the reflected red light, the reflected green light and the reflected blue light, so that each point may achieve effect of the full-color display.

The disclosure takes the optical properties (reflectivity, transmittance, absorption and the like) of the electrochromic material to produce a stable and reversible color change reaction under the effect of electric field applied, it shows the reversible change of the color and the transparency. The disclosure does not needs to pass through the color resistance layer and liquid crystal layer back and forth twice as a conventional reflective liquid crystal display, thereby increasing the utilization of ambient light by the device.

Different from the prior art, the display panel of the disclosure is equipped with an electrochromic layer, and the different voltage characteristics of the electrochromic layer is used to improve the utilization of light and visual angle limitation of the display panel, thereby improving the performance of the liquid crystal display. In addition, compared with the general display technology, the basic structural of the reflective liquid crystal display device adopted by the disclosure effectively reduces the energy consumption of the device, and overcomes the defects that the general electrochromic display device may not display the black color through the principle of the reflective liquid crystal display device.

The foregoing contents are only the detailed description of the embodiments of the disclosure which is not intended to limit the protection scope of the disclosure. Any equivalent structures or equivalent flow transformation made using the contents of the specification and the drawings of the disclosure or directly or indirectly applied to other related technical fields are similarly included in the protection scope of the disclosure.

What is claimed is:

1. A reflective electrochromic display panel, comprising: an upper substrate, a common electrode layer, an electrochromic layer, a pixel electrode layer and a lower substrate sequentially arranged from top to bottom; the electrochromic layer comprising a red electrochromic layer, a green electrochromic layer and a blue electrochromic layer, the red electrochromic layer reflecting a red light when receiving a voltage through the common electrode layer and the pixel electrode layer, the green electrochromic layer reflecting a green light when receiving the voltage through the common electrode layer and the pixel electrode layer, the blue electrochromic layer reflecting a blue light when receiving the voltage through the common electrode layer and the pixel electrode layer, and the intensity of the reflected light being increased with increasing of the voltage the increasing voltage;

wherein a partition is arranged among the red electrochromic layer, the green electrochromic layer and the blue electrochromic layer;

wherein a black light shield layer for absorbing light is the lower substrate, or the lower substrate is a transparent substrate and the black light shield layer is arranged on the transparent substrate, the red electrochromic layer, the green electrochromic layer and the blue electrochromic layer display as a transparent state when not receiving the voltage through the common electrode layer and the pixel electrode layer, and at this time the reflective electrochromic display panel displays a black color.

2. The reflective electrochromic display panel according to claim 1, wherein both of the common electrode layer and the pixel electrode layer are transparent electrode layers.

3. The reflective electrochromic display panel according to claim 2, wherein a material of the common electrode layer and the pixel electrode layer is ITO.

4. The reflective electrochromic display panel according to claim 1, wherein materials of the electrochromic layer comprises one or more of viologen, polythiophene and derivative thereof, polyaniline compound, pyridine compound, anthracene compound, rare earth element organic compound.

5. The reflective electrochromic display panel according to claim 1, wherein a material of the black light shield layer is a Cr metal, an acrylic resin incorporated with a black pigment, or a black resin formed by incorporating raw materials of carbon, Ti and Ni in a photoresist.

6. The reflective electrochromic display panel according to claim 1, wherein the upper substrate is one of a glass substrate, a transparent film package, and a transparent flexible substrate.

7. A reflective electrochromic display panel, comprising: an upper substrate, a common electrode layer, an electrochromic layer, a pixel electrode layer and a lower substrate sequentially arranged from top to bottom; the electrochromic layer comprising a red electrochromic layer, a green electrochromic layer and a blue electrochromic layer, the red electrochromic layer reflecting a red light when receiving a voltage through the common electrode layer and the pixel electrode layer, the green electrochromic layer reflecting a green light when receiving the voltage through the common electrode layer and the pixel electrode layer, the blue electrochromic layer reflecting a blue light when receiving the voltage through the common electrode layer and the pixel electrode layer, and the intensity of the reflected light being increased with increasing of the voltage;

wherein the lower substrate is a black light shield substrate for absorbing light, or the lower substrate is a transparent substrate and a black light shield layer is arranged on the transparent substrate and for absorbing light a material of the black light shield layer is a Cr metal, an acrylic resin incorporated with a black pigment, or a black resin formed by incorporating raw materials of carbon, Ti and Ni in a photoresist, the red electrochromic layer, the green electrochromic layer and the blue electrochromic layer display as a transparent state when not receiving the voltage through the common electrode layer and the pixel electrode layer, and at this time the reflective electrochromic display panel displays a black color.

8. The reflective electrochromic display panel according to claim 7, wherein both of the common electrode layer and the pixel electrode layer are transparent electrode layers.

9. The reflective electrochromic display panel according to claim 8, wherein a material of the common electrode layer and the pixel electrode layer is ITO.

10. The reflective electrochromic display panel according to claim 7, wherein a material of the electrochromic layer comprises one or more of viologen, polythiophene and derivatives thereof, polyaniline compound, pyridine compound, anthracene compound, rare earth element organic compound.

11. The reflective electrochromic display panel according to claim 7, wherein a partition is arranged among the red electrochromic layer, the green electrochromic layer and the blue electrochromic layer.

12. The reflective electrochromic display panel according to claim 7, wherein the upper substrate is one of a glass substrate, a transparent film package, and a transparent flexible substrate.

* * * * *